United States Patent
Hill et al.

(10) Patent No.: US 9,126,857 B2
(45) Date of Patent: Sep. 8, 2015

(54) SEPARATION APPARATUSES FOR SEPARATING SHEETS OF BRITTLE MATERIAL AND METHODS FOR SEPARATING SHEETS OF BRITTLE MATERIAL

(71) Applicants: Keith Mitchell Hill, Horseheads, NY (US); Ritesh Satish Lakhkar, Painted Post, NY (US); Mark Thomas Massaro, Murray, KY (US); Liming Wang, Painted Post, NY (US); Naiyue Zhou, Painted Post, NY (US)

(72) Inventors: Keith Mitchell Hill, Horseheads, NY (US); Ritesh Satish Lakhkar, Painted Post, NY (US); Mark Thomas Massaro, Murray, KY (US); Liming Wang, Painted Post, NY (US); Naiyue Zhou, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 163 days.

(21) Appl. No.: 13/678,042

(22) Filed: Nov. 15, 2012

(65) Prior Publication Data

US 2014/0130552 A1 May 15, 2014

(51) Int. Cl.
*C03B 33/02* (2006.01)
*C03B 33/023* (2006.01)
(Continued)

(52) U.S. Cl.
CPC .......... *C03B 33/0207* (2013.01); *B28D 5/0029* (2013.01); *C03B 33/0235* (2013.01); *C03B 33/033* (2013.01); *Y10T 225/12* (2015.04); *Y10T 225/329* (2015.04); *Y10T 225/371* (2015.04)

(58) Field of Classification Search
CPC ............ C03B 33/0215; C03B 33/0207; C03B 33/033
USPC .............................................. 65/97
See application file for complete search history.

(56) References Cited

U.S. PATENT DOCUMENTS

| 3,592,370 A | 7/1971 | Boardman ......................... 225/2 |
| 3,703,115 A | 11/1972 | Nagae et al. ...................... 82/12 |

(Continued)

FOREIGN PATENT DOCUMENTS

| EP | 2316797 | 5/2011 | ............ C03B 33/027 |
| GB | 1002485 A | 8/1965 | |

(Continued)

OTHER PUBLICATIONS

PCT/US2013/069579—Notification of Transmittal of the International Search Report and the Written Opinion of the International Searching Authority, or the Declaration—Dated: Mar. 3, 2014.

*Primary Examiner* — Matthew Daniels
*Assistant Examiner* — Cynthia Szewczyk
(74) *Attorney, Agent, or Firm* — Kevin M. Able

(57) ABSTRACT

Methods and apparatuses for separating sheets of brittle material are disclosed. According to one embodiment, a separation apparatus for separating a sheet of brittle material includes a first separation cam positioned adjacent to a sheet conveyance pathway and a second separation cam positioned opposite from and downstream of the first separation cam. The first and second separation cams may be rotated such that the contact faces of the separation cams periodically extend across a centerline of the conveyance pathway. Rotation of the first and second separation cams may be synchronized such that at least the portion of the contact face of the first separation cam and at least the portion of the contact face of the second separation cam periodically extend across the centerline of the conveyance pathway at a separation time and periodically do not extend across the centerline of the conveyance pathway at a non-separation time.

8 Claims, 13 Drawing Sheets

(51) Int. Cl.
  *C03B 33/033* (2006.01)
  *B28D 5/00* (2006.01)

(56) References Cited

U.S. PATENT DOCUMENTS

| | | | |
|---|---|---|---|
| 3,744,690 A | 7/1973 | Gray et al. | 225/2 |
| 3,838,803 A | 10/1974 | Berry | 225/98 |
| 4,136,807 A | 1/1979 | DeTerre | 225/2 |
| 4,187,755 A | 2/1980 | Shirai | 83/882 |
| 4,454,972 A | 6/1984 | Maltby, Jr. et al. | 225/96.5 |
| 4,489,870 A | 12/1984 | Prange et al. | 225/2 |
| 5,303,861 A | 4/1994 | Allaire et al. | 225/2 |
| 5,413,263 A | 5/1995 | Bando | 225/96.3 |
| 5,535,933 A | 7/1996 | Dickerson | 225/96.5 |
| 5,857,603 A | 1/1999 | Lisec | 225/2 |
| 6,098,861 A | 8/2000 | Inoue | 225/96.5 |
| 6,616,025 B1 | 9/2003 | Andrewlavage, Jr. | 225/96.5 |
| 6,962,279 B1 | 11/2005 | Marek et al. | 225/93 |
| 7,255,253 B2 | 8/2007 | Wirsam | 225/2 |
| 7,260,959 B2 | 8/2007 | Chang et al. | 65/25.3 |
| 7,371,431 B2 | 5/2008 | Dietz et al. | 427/289 |
| 8,146,385 B2 | 4/2012 | Delia et al. | 65/97 |
| 8,269,138 B2 | 9/2012 | Garner et al. | 219/121.69 |
| 2004/0182903 A1 | 9/2004 | Marek et al. | 225/2 |
| 2006/0081673 A1 | 4/2006 | Schenk et al. | |
| 2006/0261118 A1 | 11/2006 | Cox et al. | 225/96 |
| 2007/0051769 A1 | 3/2007 | Otoda et al. | 225/2 |
| 2008/0173687 A1 | 7/2008 | Hoetzel | 225/2 |
| 2010/0065599 A1 | 3/2010 | Nishisaka et al. | 225/96.5 |
| 2010/0162758 A1 | 7/2010 | Lang | 65/29.11 |
| 2011/0126593 A1 | 6/2011 | Abdul-Rahman et al. | 65/97 |
| 2011/0226832 A1 | 9/2011 | Bayne et al. | 225/2 |
| 2012/0103018 A1 | 5/2012 | Lu et al. | 65/29.12 |

FOREIGN PATENT DOCUMENTS

| | | |
|---|---|---|
| JP | 2596054 B2 | 4/1997 |
| JP | 2007/297253 A | 11/2007 |
| WO | 2011/064931 A1 | 6/2011 |

SEPARATION APPARATUSES FOR SEPARATING SHEETS OF BRITTLE MATERIAL AND METHODS FOR SEPARATING SHEETS OF BRITTLE MATERIAL

BACKGROUND

1. Field

The present specification generally relates to the manufacture of discrete sheets of brittle material, such as glass, ceramic or the like, and, more specifically, to apparatuses for separating sheets of brittle material from continuous ribbons of brittle material and methods for separating sheets of brittle material from continuous ribbons of brittle material.

2. Technical Background

Sheets of brittle material, such as sheets of glass or ceramic material, may be formed as continuous ribbons. For example, continuous glass ribbons are commonly formed by down-draw processes, such a fusion draw processes or slot draw processes. As the molten glass is drawn, the glass cools and solidifies. Ultimately, individual sheets of glass are sectioned from the continuous glass ribbon. These individual sheets of glass sectioned from continuous glass ribbons can be used in a variety of devices including flat panel displays, touch sensors, photovoltaic devices and other electronic applications.

The rate of ribbon formation is often adjusted to accommodate the speed of manufacturing processes downstream of the ribbon formation as the cycle time of such processes (such as separation processes and the like) are often slower than the maximum rate of ribbon formation. For example, in continuous glass ribbon forming operations, the glass ribbon is often segmented in to discrete glass sheets utilizing equipment that tracks with and attaches to the continuous glass ribbon as the glass ribbon is conveyed in a draw direction. Once the separation operation is completed, the equipment detaches from the glass ribbon and cycles upstream to repeat the process. The cycle time of these operations is slower than the maximum rate of ribbon formation and, as such, the rate of ribbon formation is reduced to accommodate the cycle time of the separation process. However, reducing the cycle time of the processes also reduces production throughput.

Accordingly, a need exists for alternative methods and apparatuses for separating discrete sheets of brittle material from continuous ribbons of brittle material.

SUMMARY

In one embodiment, a separation apparatus for separating a sheet of brittle material along a scoring line may include a first separation cam positioned adjacent to a conveyance pathway. The first separation cam may be rotatably coupled to a first drive mechanism rotating the first separation cam about a first axis of rotation. The first drive mechanism may rotate the first separation cam such that at least a portion of a contact face of the first separation cam periodically extends across a centerline of the conveyance pathway. The first drive mechanism may be synchronized with a draw rate of the sheet of brittle material such that at least the portion of the contact face of the first separation cam extends across the centerline of the conveyance pathway at a separation time and periodically does not extend across the centerline of the conveyance pathway at a non-separation time.

In another embodiment, a method for separating a glass substrate may include conveying a scored glass ribbon on a conveyance pathway in a conveyance direction. The scored glass ribbon may be directed between a first separation cam and a second separation cam. The second separation cam may be positioned downstream of the first separation cam in the conveyance direction. The first separation cam and the second separation cam may be positioned on opposite sides of a centerline of the conveyance pathway. The first separation cam may be rotated such that at least a portion of a contact face of the first separation cam is periodically positioned across the centerline of the conveyance pathway and the contact face of the first separation cam periodically contacts a first surface of the scored glass ribbon and displaces at least a portion of the scored glass ribbon from the centerline of the conveyance pathway in a first displacement direction. The second separation cam may be rotated simultaneously with the first separation cam such that at least a portion of a contact face of the second separation cam is periodically positioned across a centerline of the conveyance pathway and the contact face of the second separation cam periodically contacts a second surface of the scored glass ribbon and displaces at least a portion of the scored glass ribbon from the centerline of the conveyance pathway in a second displacement direction opposite the first displacement direction. The simultaneous displacement of the scored glass ribbon in the first displacement direction and the second displacement direction separates the scored glass ribbon along a vent in the scored glass ribbon.

In yet another embodiment, a method for forming a glass substrate includes drawing a continuous glass ribbon in a substantially vertical direction from a forming apparatus. The continuous glass ribbon may be scored to form a vent as the continuous glass ribbon is drawn in the substantially vertical direction. Thereafter, a first portion of the continuous scored glass ribbon may be periodically displaced in a first direction which is non-parallel with the substantially vertical direction as the continuous scored glass ribbon is drawn in the substantially vertical direction. Additionally, a second portion of the continuous scored glass ribbon may be periodically displaced in a second direction opposite the first direction as the continuous glass ribbon is drawn in the substantially vertical direction. The second portion of the continuous scored glass ribbon may be downstream of the first portion of the continuous scored glass ribbon. The second portion of the continuous scored glass ribbon is displaced simultaneously with the first portion of the continuous scored glass ribbon such that a glass substrate is separated from the continuous glass ribbon along the vent.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 2:
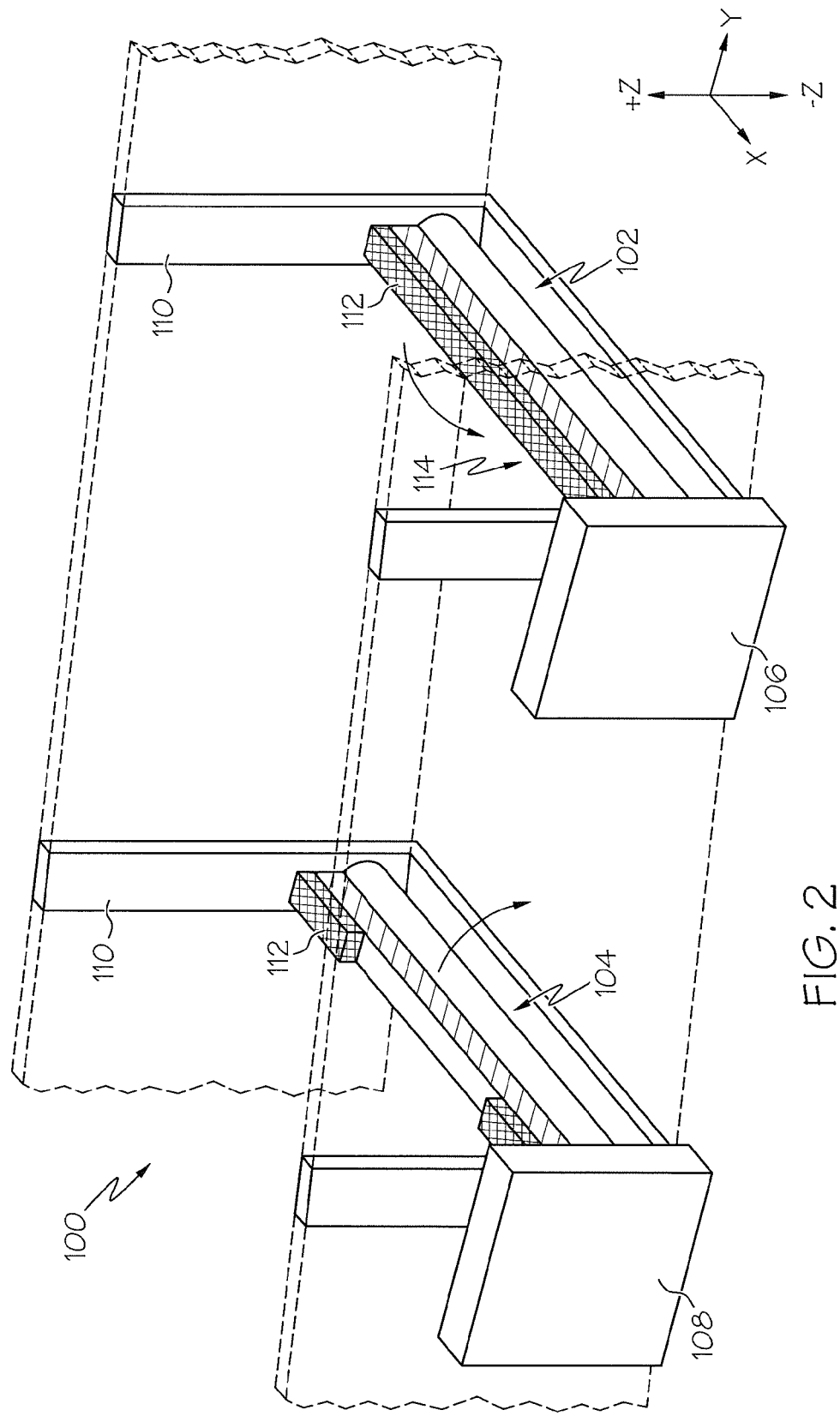
FIG. 2 schematically depicts an isometric view of the separation apparatus of FIG. 1 according to one or more embodiments shown and described herein.

Reference will now be made in detail to embodiments of apparatuses and methods for separating sheets of brittle material from continuous ribbons of brittle material, examples of which are illustrated in the accompanying drawings. Whenever possible, the same reference numerals will be used throughout the drawings to refer to the same or like parts. One embodiment of a separation apparatus for separating substrates of brittle material, such as glass sheets or the like, is schematically depicted in FIG. 2. The apparatus generally comprises a first separation cam positioned adjacent to a conveyance pathway and a second separation cam positioned opposite from and downstream of the first separation cam on the conveyance pathway. The first and second separation cams are rotatably coupled to drive mechanisms which rotate the cams such that at least the portion of the contact face of the first separation cam and at least the portion of the contact face of the second separation cam periodically extends across the centerline of the conveyance pathway at a separation time. When the first separation cam and the second separation cam extend across the centerline of the conveyance pathway at the same time, the cams displace a scored segment of the continuous ribbon of brittle material in opposite directions, thereby separating the segment from the remainder of the continuous ribbon along the score line. The separation apparatus and methods for separating substrates of brittle material will be described in more detail herein with specific reference to the appended drawings.

Figure 1:
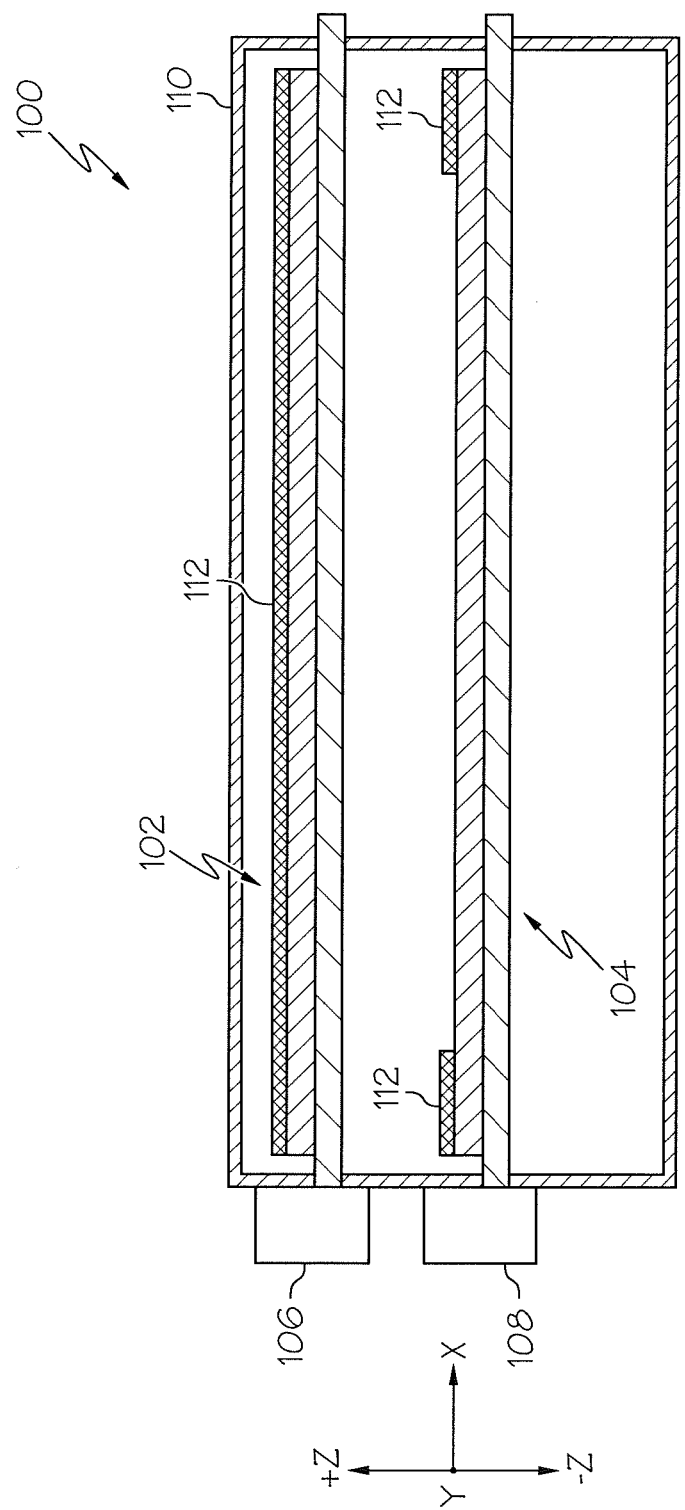
FIG. 1 schematically depicts a cross section of a separation apparatus for separating a sheet of brittle material according to one or more embodiments shown and described herein.
Figure 3:
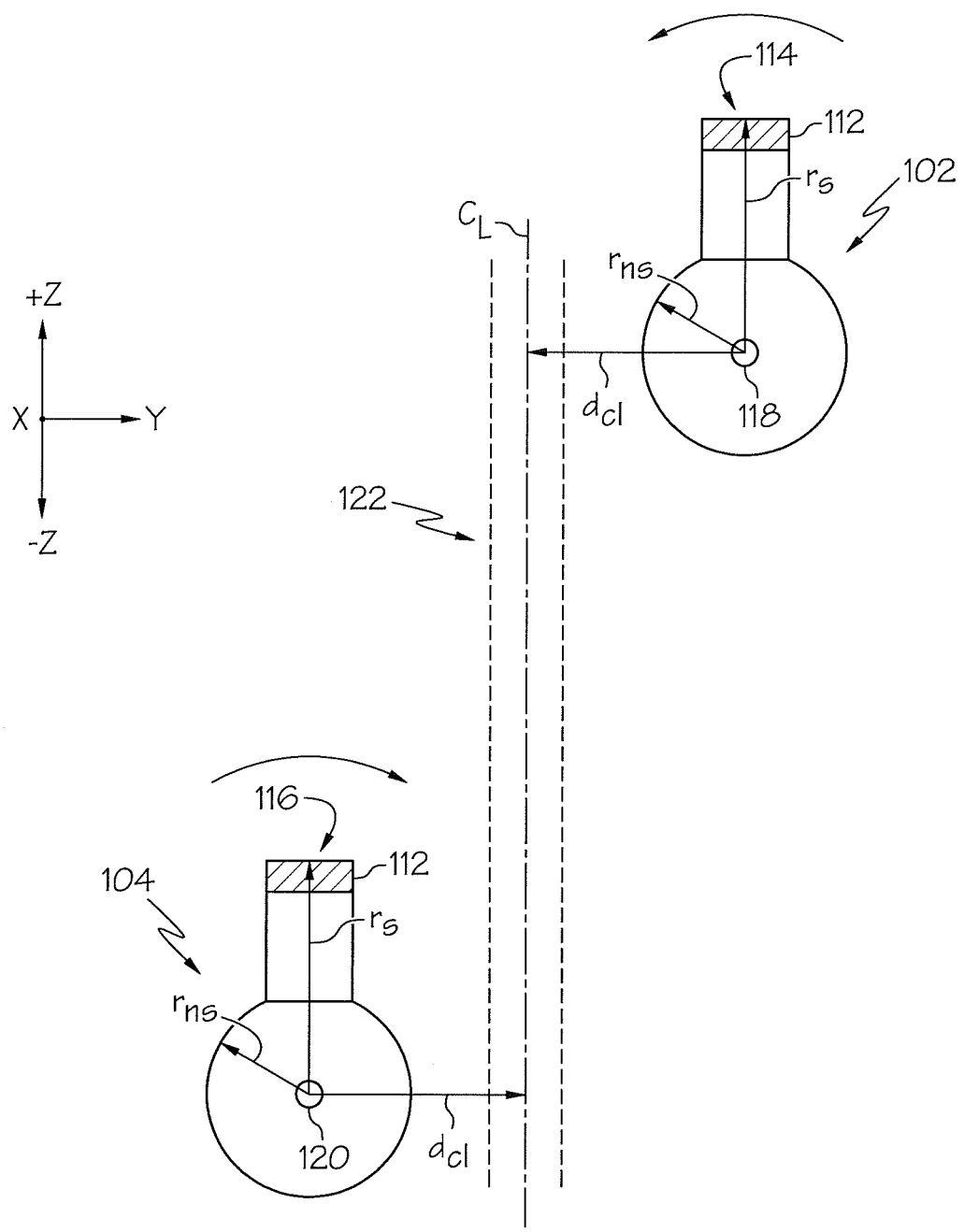
FIG. 3 schematically depicts an enlarged cross section of the separation apparatus of FIGS. 1 and 2 indicating the spatial orientation of the separation cams and the conveyance pathway formed therebetween, according to one or more embodiments shown and described herein.
Figure 11:
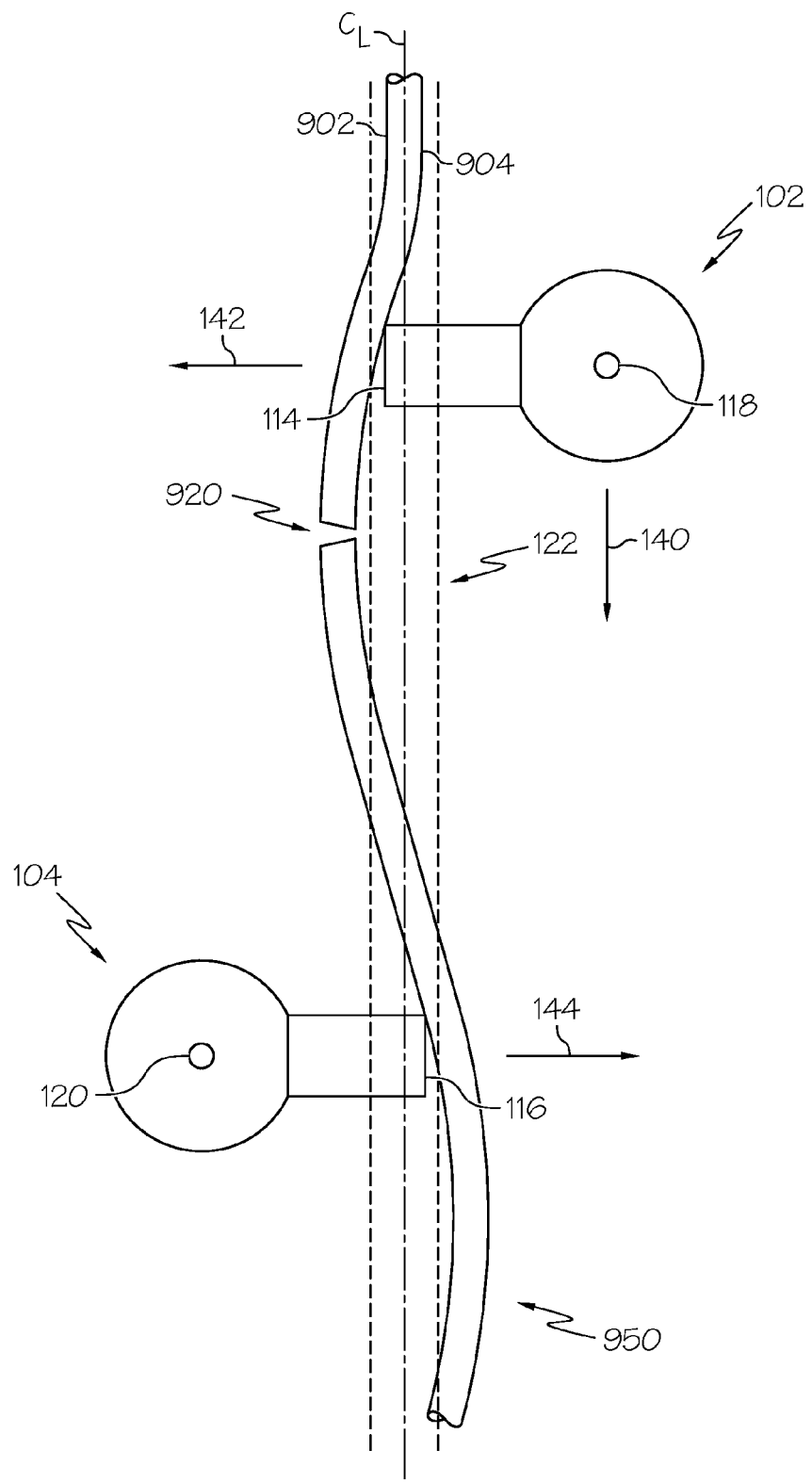

Referring now to FIGS. 1-3, one embodiment of a separation apparatus 100 for separating a sheet of brittle material from a continuous ribbon of brittle material, such as glass, ceramic or the like, is schematically depicted. The separation apparatus 100 generally comprises a first separation cam 102 and a second separation cam 104. The first separation cam 102 and the second separation cam 104 are supported in a frame 110 such that the first separation cam 102 and the second separation cam 104 are rotatable with respect to the frame 110. In the embodiments described herein, the first separation cam 102 and the second separation cam are positioned on opposite sides of a conveyance pathway 122 (FIG. 3) with the second separation cam 104 offset from the first separation cam 102 in a downstream direction (i.e., in the −z direction of the coordinate axes depicted in the figures). In the embodiments described herein, the conveyance pathway 122 is vertically oriented (i.e., the conveyance pathway 122 extends in the +/−z-directions of the coordinate axes depicted in FIGS. 1-3). However, it should be understood that, in other embodiments, the conveyance pathway may be horizontally oriented or, alternatively, oriented at an angle between horizontal and vertical. In the embodiment of the separation apparatus 100 depicted in FIG. 2 the separation apparatus is depicted with substantial spacing between the first separation cam 102 and the second separation cam 104 for purposes of illustration and clarity. In practice, the spacing between the first separation cam 102 and the second separation cam 104 is much less to facilitate contacting and displacing a continuous ribbon of brittle material drawn on the conveyance pathway 122 between the first separation cam 102 and the second separation cam 104, as depicted in FIG. 11. For example, the spacing between separation cams can be equal to or less than 1 mm, depending on the thickness of the continuous ribbon of brittle material.

The first separation cam 102 and the second separation cam 104 may be coupled to a rotational mechanism which actively rotates the first separation cam 102 and the second separation cam 104 with respect to the frame 110. For example, in the embodiment of the separation apparatus 100 depicted in FIG. 2, the first separation cam 102 is coupled to a first drive mechanism 106 which, in this embodiment, is a stand-alone drive source, such as a servo motor or the like. Similarly, the second separation cam 104 is coupled to a second drive mechanism 108 which, in this embodiment, is a stand-alone drive source, such as a servo motor or the like. The first and second drive mechanisms 106, 108 are capable of rotating the first separation cam 102 and the second separation cam 104 with respect to the frame 110. In addition, in embodiments where the first and second drive mechanisms 106, 108 are servo motors, as described above, the first and second drive mechanisms 106, 108 may be coupled to a controller (not shown) such that the first and second drive mechanisms 106, 108 may be synchronously driven.

While the drive mechanisms 106, 108 of the embodiment of the separation apparatus 100 depicted in FIGS. 1 and 2 are described as being servo motors, it should be understood that, in alternative embodiments, the drive mechanisms 106, 108 may be transmission systems, such as gears, belts or the like, which rotatably couple the first separation cam 102 and the second separation cam 104 to a common drive source, such as a servo motor or the like thereby facilitating rotation of the first separation cam 102 and the second separation cam 104 with respect to the frame 110.

Still referring to FIGS. 1-3, in the embodiments described herein, the separation cams 102, 104 are attached to the drive mechanisms 106, 108, respectively, such that the first separation cam 102 is rotated about a first axis of rotation 118 and the second separation cam 104 is rotated about a second axis of rotation 120. In the embodiments described herein, the first axis of rotation 118 and the second axis of rotation 120 are generally parallel with one another. Specifically, both the first axis of rotation 118 and the second axis of rotation 120 are generally parallel to the x-axis of the coordinate axes depicted in FIG. 1-3. As noted hereinabove, the second separation cam 104 may be offset from the first separation cam 102 in a downstream direction. Accordingly, the second axis of rotation 120 corresponding to the second separation cam 104 is offset from the first axis of rotation 118 corresponding to the first separation cam 102.

Referring now to FIG. 3, the separation cams 102, 104 are constructed such that the separation cams are not circular-symmetric about their respective axes of rotation which, in turn, allows the separation cams to be periodically engaged (and periodically disengaged) from a ribbon of brittle material drawn along the conveyance pathway. Specifically, the separation cams 102, 104 are each constructed with contact faces 114, 116 for engaging with opposing surfaces of a ribbon of brittle material drawn along the conveyance pathway 122. In a cross section of the separation cam perpendicular to the axis of rotation, the contact faces 114, 116 of each separation cam 102, 104 generally have a separation radius $r_s$ (measured from the center of the axis of rotation to the contact face) which is greater than the non-separation $r_{ns}$ (measured from the center of the axis of rotation to a point on the surface of the cam) of the remainder of the separation cam. In the embodiments of the separation cams 102, 104 depicted in FIGS. 1-3, this is accomplished by constructing the separation cam such that the cam has a rectangular extension which extends from a circular main body and locating the axis of rotation at the center of the circular main body. Accordingly, for a sheet of material positioned at or within the separation radius $r_s$ of the separation cam, rotating the separation cam about the axis of rotation of the separation cam causes the contact surface to periodically contact the sheet of material and to periodically not contact the sheet of material.

Figure 4:
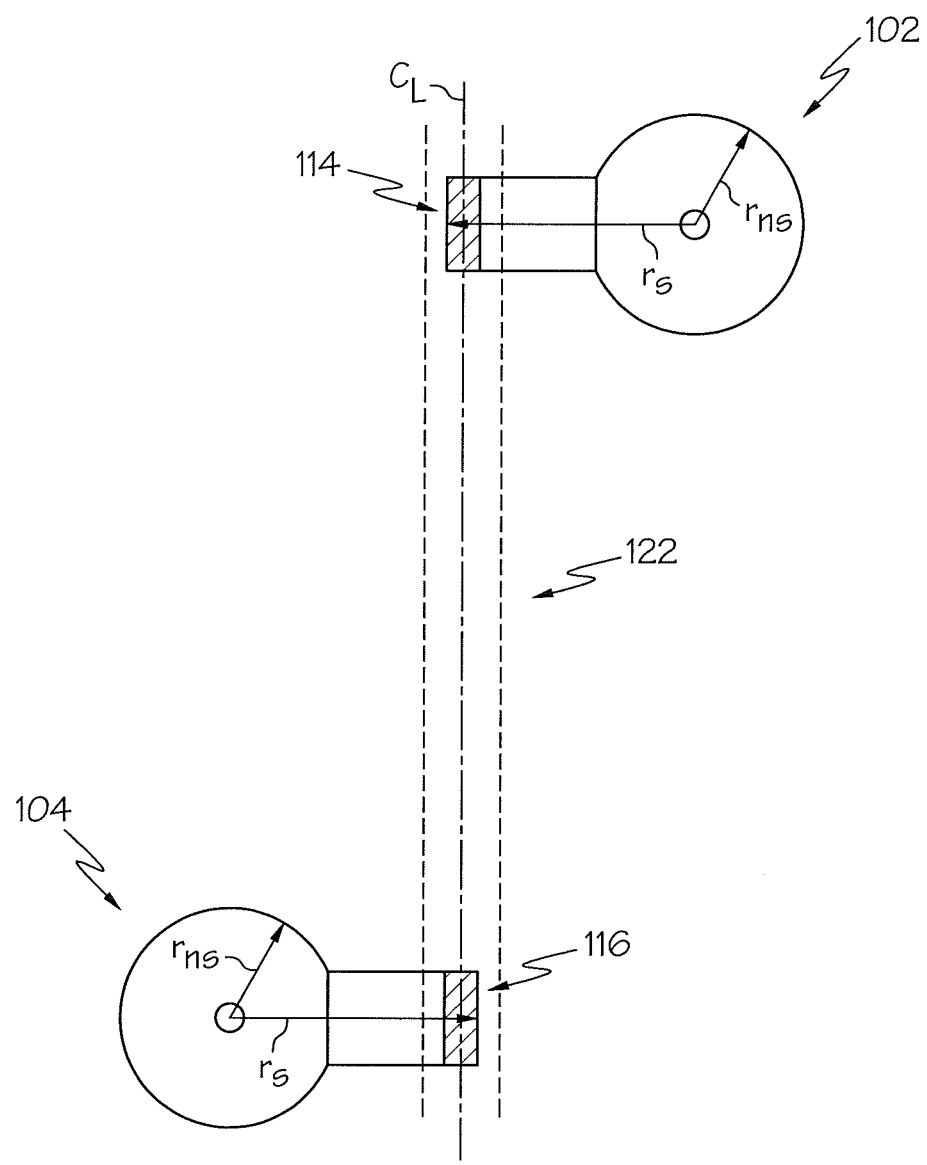
FIG. 4 schematically depicts the first separation cam and second separation cam of the separation apparatus of FIGS. 1 and 2 in a separation orientation, according to one or more embodiments shown and described herein.

Referring now to FIGS. 3 and 4, in the embodiments of the separation apparatus 100 shown and described herein, the separation cams 102, 104 are positioned relative to the conveyance pathway such that the contact faces 114, 116 of the respective separation cams 102, 104 periodically extend across a centerline $C_L$ of the conveyance pathway 122 as the separation cams 102, 104 are rotated about their respective axes of rotation, as depicted in FIG. 4. Specifically, the separation cams are positioned such that the separation radius $r_s$ of the separation cams is greater than or equal to the distance $d_{CL}$ between the center of the axis of rotation of the separation cam and the center line $C_L$ of the conveyance pathway 122. Moreover, to ensure that the separation cams 102, 104 are periodically disengaged from ribbons of brittle material drawn on the conveyance pathway 122, the separation cams 102, 104 are positioned such that the distance $d_{CL}$ between the center of the axis of rotation of the separation cam and the center line $C_L$ of the conveyance pathway 122 is greater than the non-separation radius $r_{ns}$ of the separation cam.

While FIGS. 3-4 schematically depict separation cams with a specific cross sectional shape which may be utilized to achieve the aforementioned orientations relative to the centerline of the conveyance pathway, it should be understood that separation cams with other cross sectional configurations may be utilized to achieve the same orientations with respect to the centerline of the conveyance pathway.

Figure 5:
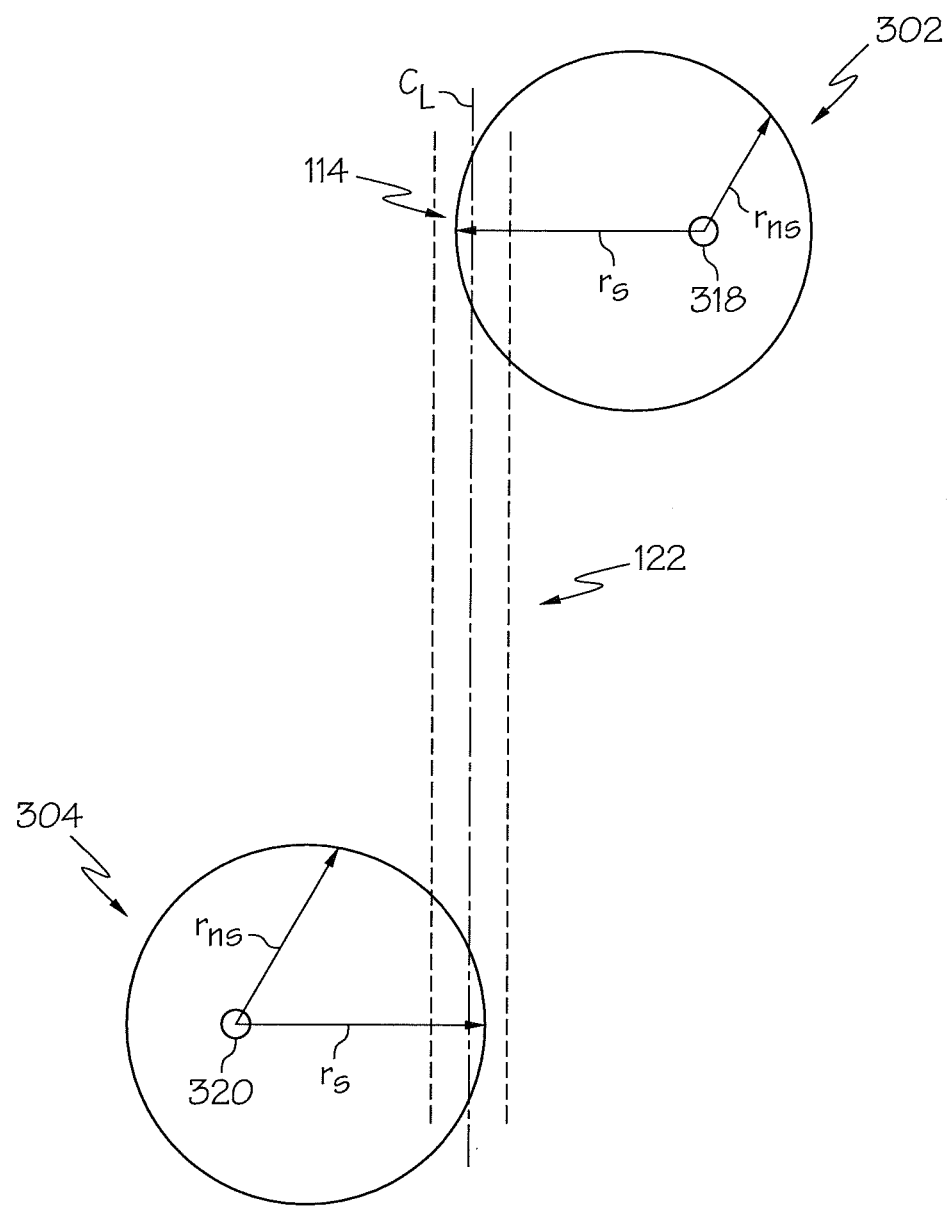
FIG. 5 schematically depicts a cross section of an alternative embodiment of a separation apparatus in which the separation cams are circular in cross section, according to one or more embodiments shown and described herein.

Referring to FIG. 5 by way of example, FIG. 5 schematically depicts an embodiment of a separation apparatus in which the first separation cam 302 and the second separation cam 304 are circular in cross section. In this embodiment, the first axis of rotation 318 of the first separation cam 302 is non-concentric with the center of the first separation cam 302. Similarly, the second axis of rotation 320 of the second separation cam 304 is non-concentric with the center of the second separation cam 304. The configuration of these separation cams enables the separation cams to be positioned such that the separation radius $r_s$ of the separation cams is greater than or equal to the distance $d_{CL}$ between the center of the axis of rotation of the separation cam and the center line $C_L$ of the conveyance pathway 122, as described above, and that the distance $d_{CL}$ between the center of the axis of rotation of the separation cam and the center line $C_L$ of the conveyance pathway 122 is greater than the non-separation radius $r_{ns}$ of the separation cam, also as described above.

Figure 6:
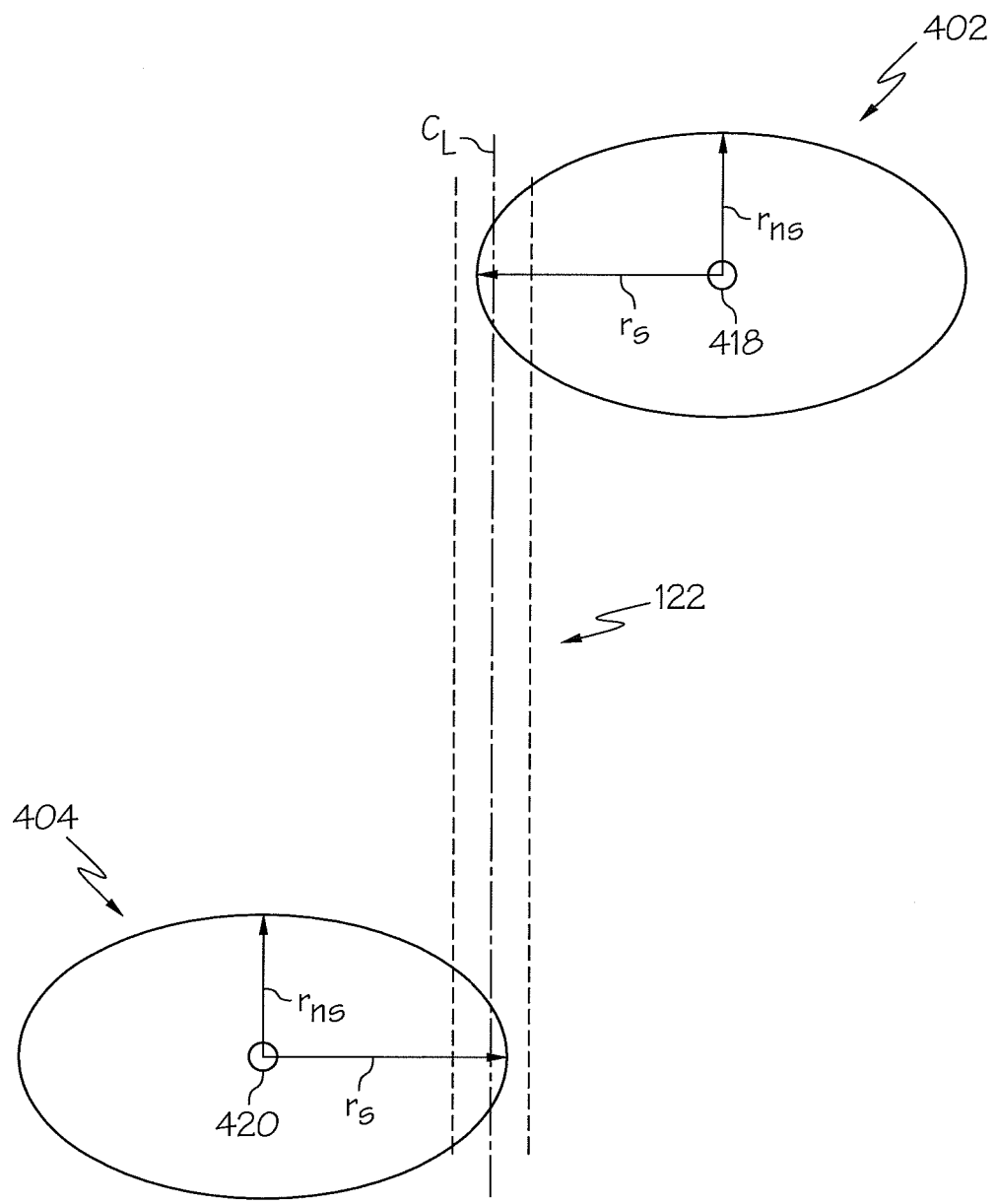
FIG. 6 schematically depicts a cross section of an alternative embodiment of a separation apparatus in which the separation cams are elliptical in cross section, according to one or more embodiments shown and described herein.

Alternatively, the first and second separation cams may be elliptical in cross section as shown in FIG. 6. Specifically, the first separation cam 402 may be elliptical in cross section with a major axis and a minor axis. The separation radius $r_s$ of the first separation cam 402 generally corresponds to the major axis of the ellipse while the non-separation radius $r_{ns}$ of the first separation cam generally corresponds to the minor axis of the ellipse. While the first axis of rotation 418 of the first separation cam is located at the intersection of the major and minor axes of the ellipse, the first separation cam 402 is non-circular symmetric with respect to the center of the first axis of rotation. Similarly, the second separation cam 404 may be elliptical in cross section with a major axis and a minor axis. The separation radius $r_s$ of the second separation cam 404 generally corresponds to the major axis of the ellipse while the non-separation radius $r_{ns}$ of the second separation cam generally corresponds to the minor axis of the ellipse. While the second axis of rotation 420 of the second separation cam is located at the intersection of the major and minor axes of the ellipse, the second separation cam 404 is non-circular symmetric with respect to the center of the second axis of rotation 420. The configuration of these separation cams enables the separation cams to be positioned such that the separation radius $r_s$ of the separation cams is greater than or equal to the distance $d_{CL}$ between the center of the axis of rotation of the separation cam and the center line $C_L$ of the conveyance pathway 122, as described above, and that the distance $d_{CL}$ between the center of the axis of rotation of the separation cam and the center line $C_L$ of the conveyance pathway 122 is greater than the non-separation radius $r_{ns}$ of the separation cam, also as described above.

Figure 7:
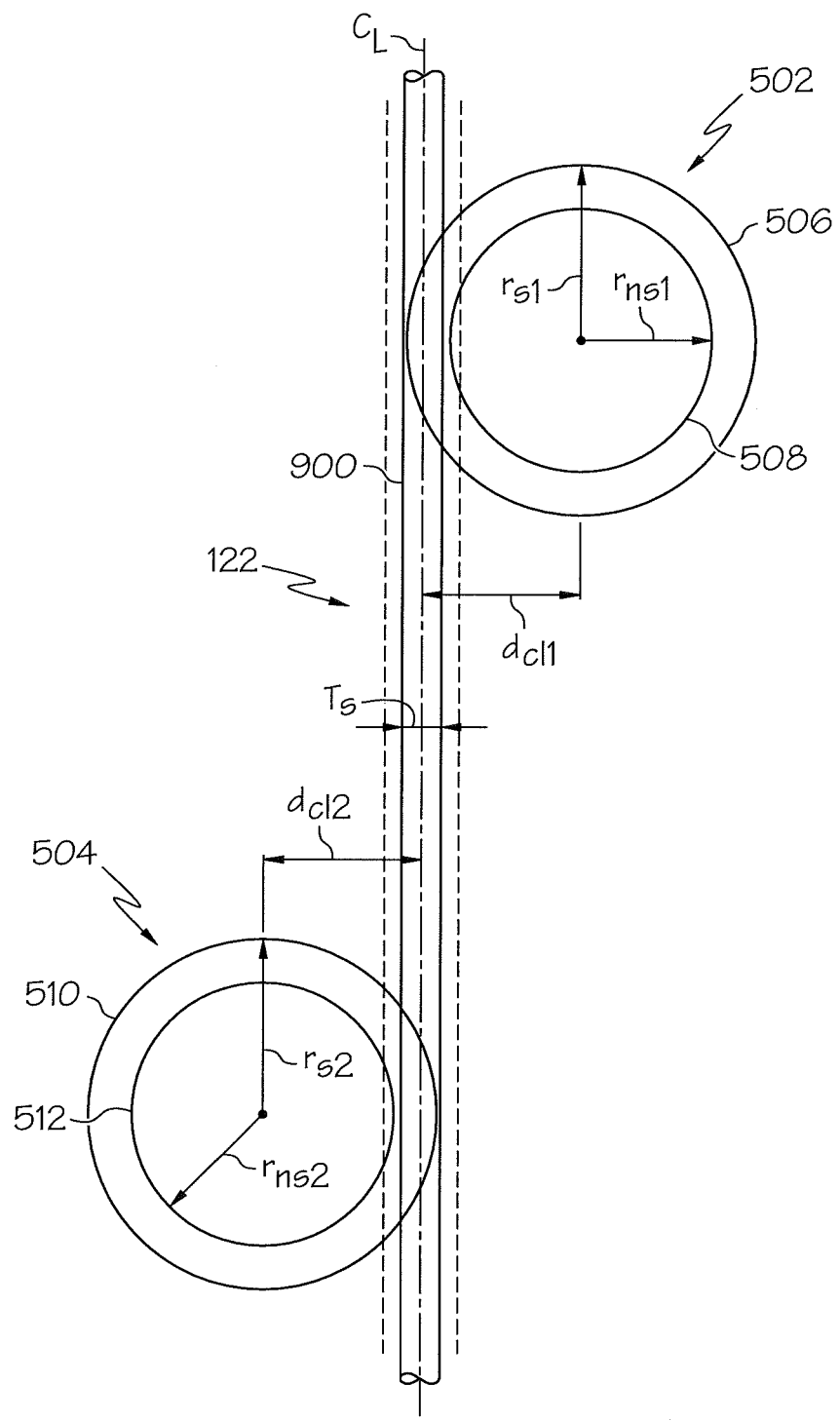
FIG. 7 schematically depicts the separation sweep areas of the first and second separation cams of the separation apparatuses described herein.

Based on the foregoing, it should be understood that separation cams with various cross-sectional shapes may be used in the separation apparatuses described herein. In general, the separation cams of the separation apparatuses described herein are constructed with a separation radius $r_s$ and a non-separation radius $r_{ns}$ such that, as each cam is rotated about its respective axis of rotation, the cam defines a separation sweep area and a non-separation sweep area, both of which are centered on the axis of rotation. The separation sweep area is greater than the non-separation sweep area. For example, FIG. 7 schematically depicts a first separation sweep area 506 and a first non-separation sweep area 508 of a first separation cam 502. FIG. 7 also schematically depicts a second separation sweep area 510 and a second non-separation sweep area 512 of a second separation cam 504.

Moreover, in some embodiments described herein, the sum of the non-separation radius $r_{ns}$ of the first separation cam (i.e., $r_{ns1}$) and the non-separation radius $r_{ns}$ (i.e., $r_{ns2}$) of the second separation cam is less than or equal to the sum of the distance between the center point of the axis of rotation of the first separation cam (i.e., $r_{ns1}$) and the center line $C_L$ of the conveyance pathway and the distance $d_{CL}$ between the center point of the axis of rotation of the second separation cam and the centerline $C_L$ of the conveyance pathway (i.e., $r_{ns2}$) minus the thickness of the thickness Ts of the continuous ribbon of brittle material 900 drawn on the conveyance pathway 122 (i.e., $r_{ns1} + r_{ns2} \leq (d_{CL1} + d_{CL2} - T_s)$. Configuring the separation cams such that this relationship is satisfied results in the separation cams being periodically completely disengaged from the continuous ribbon of brittle material as the cams are rotated.

Referring again to FIGS. 1-3, the separation apparatuses described herein may be used to separate discrete sheets of brittle material from continuous ribbons of brittle material such as glass, ceramic, or glass-ceramic materials. The surfaces of these materials may be susceptible to damage, such as nicks, scratches, cracks or the like. Accordingly, in order to prevent the contact faces 114, 116 of the separation cams 102, 104 from damaging the continuous ribbons of brittle material, the contact faces 114, 116 of the separation cams 102, 104 may include a nosing material 112 which mitigates damage to the surfaces of the continuous ribbons of brittle material. In the embodiments described herein, the nosing material may be formed from a variety of materials including, without limitation, silicone, aluminum, Torlon®, PEAK, and UHMW. The nosing is not limited to any particular cross-sectional geometry, but may be square, rounded or a point contact.

In some embodiments, the nosing material 112 may extend across the entire width of the separation cam. Alternatively, the nosing material 112 may extend across less than the entire width of the separation cam. For example, in FIGS. 1 and 2 the nosing material 112 of the first separation cam 102 extends across the entire width of the first separation cam 102. However, the nosing material 112 of the second separation cam 104 is only positioned proximate the ends of the second separation cam 104 and not in the middle of the second separation cam 104. A separation apparatus 100 with separation cams having nosing material configured as depicted in FIGS. 1 and 2 is particularly useful for preventing contact with quality areas of the continuous ribbon of brittle material on at least one side of the continuous ribbon. The phrase "quality areas" as used herein, refers to a central region of the continuous ribbon of brittle material which is spaced apart from the lateral edges of the continuous ribbon of brittle material.

While FIGS. 1 and 2 depict a separation apparatus in which the nosing material extends across the entire width of the first separation cam and the nosing material of the second separation cam extends across less than the entire width of the second separation cam, it should be understood that the separation apparatus may be constructed such that the nosing material extends across the entire width of both the first and second separation cams or, alternatively, such that the nosing material extends across less than the entire width of both the first and second separation cams.

Figure 8:
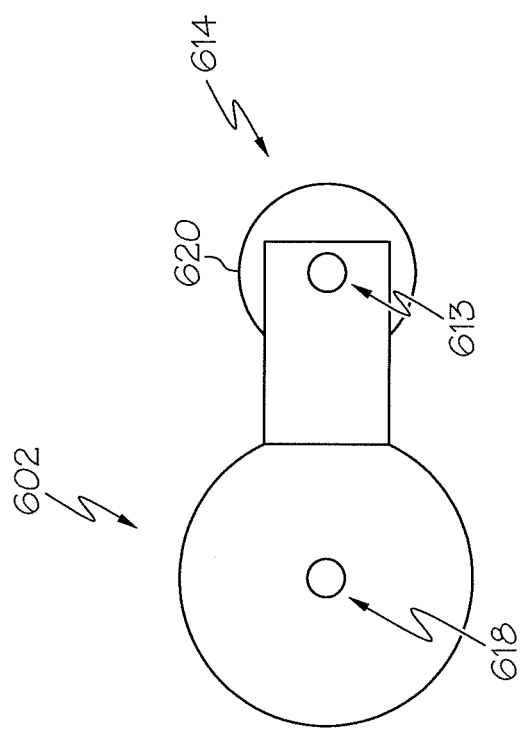
FIG. 8 schematically depicts a cross section of an alternative embodiment of a separation cam comprising a roller formed from a nosing material.

Referring now to FIG. 8, an alternative embodiment of a separation cam 602 is schematically depicted. In this embodiment, the contact face 614 of the separation cam 602 is formed from a roller element 620 which is rotatably attached to the separation cam 602. The roller element 620 may be formed from the same material and/or have the same Shore A hardness as the nosing material described above. In this embodiment, the axis of rotation 613 of the roller element 620 is parallel with and offset from the axis of rotation 618 of the separation cam 602. Utilizing a separation cam 602 in which the contact face 614 comprises a roller element 620 further reduces the friction between the separation cam 602 and a surface of the continuous ribbon of brittle material which the separation cam 602 periodically contacts, thereby mitigating the potential for damage to the continuous ribbon of brittle material.

Figure 9:
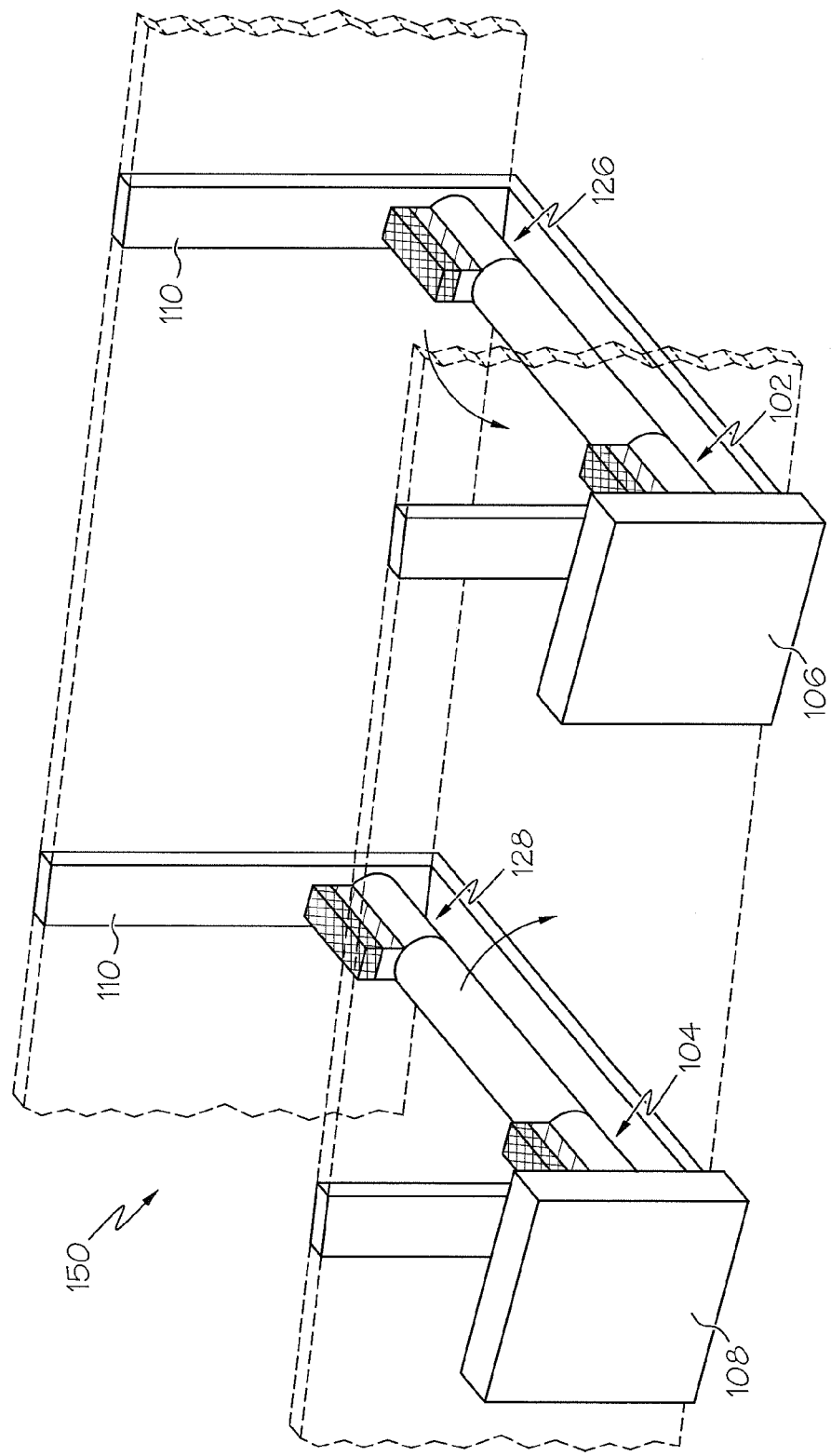
FIG. 9 schematically depicts an alternative embodiment of a separation apparatus which includes four separation cams.
Figure 10:
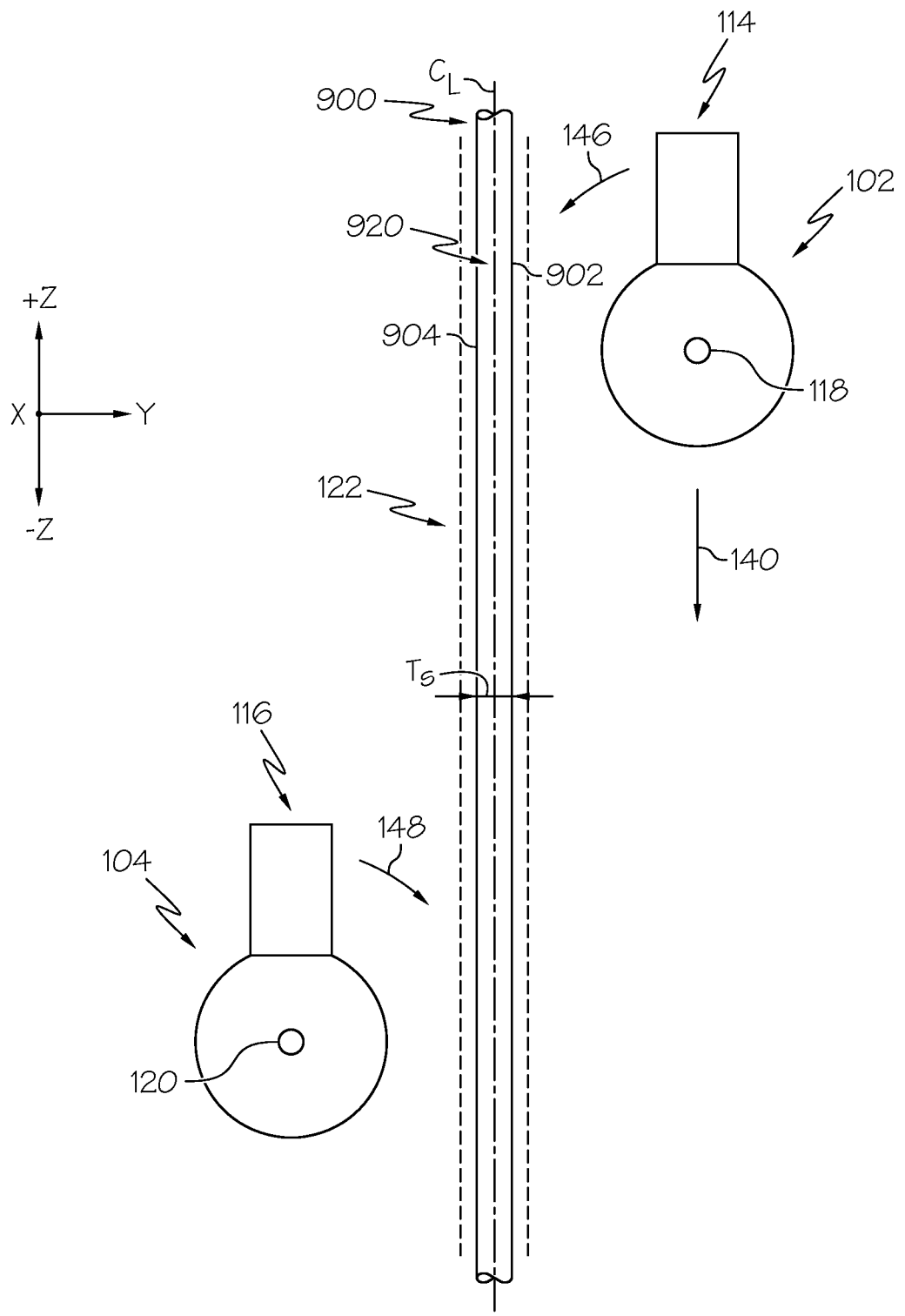
FIGS. 10 and 11 schematically depict a separation apparatus being used to separate a glass substrate according to one or more embodiments shown and described herein.

Referring now to FIG. 9, an alternative embodiment of a separation apparatus 150 is schematically depicted. In this embodiment, the separation apparatus 150 further comprises a third separation cam 126 positioned on the same side of the conveyance pathway as the first separation cam 102. The third separation cam 126 has an axis of rotation which is coaxial with the first separation cam 102. The separation apparatus 150 may also comprise a fourth separation cam 128 positioned on a same side of the conveyance pathway as the second separation cam 104. The fourth separation cam 128 may have an axis of rotation which is coaxial with the second separation cam 104. In this embodiment, the third separation cam 126 may be directly coupled to the first separation cam 102 and the first drive mechanism 106, such as when the third separation cam 126 and the first separation cam 102 are coupled with a common axle. Similarly, the fourth separation cam 128 may be directly coupled to the second separation cam 104 and the second drive mechanism 108, such as when the fourth separation cam 128 and the second separation cam 104 are coupled with a common axle. However, in another embodiment (not shown), each of the third separation cam 126 and the fourth separation cam 128 are independently rotated by separate drive mechanisms and decoupled from both the first separation cam 102 and the second separation cam 104. Separation apparatuses which include a third separation cam 126 and a fourth separation cam 128 may be used to prevent contact with the quality areas of a continuous ribbon of brittle material separated with the separation apparatus 150. In the embodiment of the separation apparatus 150 depicted in FIG. 9 the separation apparatus is depicted with substantial spacing between opposing separation cams for purposes of illustration and clarity. In practice, the spacing between opposing separation cams is much less to facilitate contacting and displacing a continuous ribbon of brittle material drawn on the conveyance pathway 122 between the separation cams, as depicted in FIG. 11. For example, the spacing between separation cams can be equal to or less than 1 mm, depending on the thickness of the continuous ribbon of brittle material.

While the separation apparatuses disclosed herein have been described and illustrated as including first and second separation cams, it should be understood that, in some embodiments, the separation apparatuses may include a single separation cam, such as when the separation apparatus includes only the first separation cam instead of first and second separation cams. In these embodiments, the first separation cam may have any of the geometrical configurations as described above with respect to separation apparatuses which include first and second separation cams.

Methods of using the separation apparatuses described herein will now be described in more detail with specific reference to FIGS. 1-2 and 10-11.

Referring now to FIGS. 1-2 and 10-11, a continuous ribbon of brittle material, such as a continuous glass ribbon, is drawn on the conveyance pathway 122 in a draw direction 140 which, in this embodiment, is a substantially vertical direction. The center through the thickness Ts of the continuous glass ribbon is at least initially aligned with the centerline $C_L$ of the conveyance pathway 122. As the continuous glass ribbon is drawn, the ribbon may be scored across the width of the ribbon thereby creating a vent 920 in at least one surface of the ribbon. The term "vent," as used herein, refers to a defect, such as a nick, scratch or the like, introduced into the surface of the substrate which serves as an initiation site and guide for controlled crack propagation during subsequent separation. The vent generally does not extend through the thickness of the substrate. The scoring operation for forming the vent may be performed using conventional scoring techniques including, without limitation, mechanical scoring and/or laser scoring. As the continuous scored glass ribbon 900 is conveyed along the conveyance pathway 122, the first separation cam 102 of the separation apparatus 100 is rotated such that at least a portion of a contact face 114 of the first separation cam 102 is periodically positioned across the centerline $C_L$ of the conveyance pathway 122 such that the contact face 114 of the first separation cam 102 can contact a first surface 902 of the continuous scored glass ribbon 900 and displace a portion of the continuous scored glass ribbon 900 in a first displacement direction 142 (FIG. 11). Simultaneously, the second separation cam 104 of the separation apparatus 100 is rotated such that at least a portion of a contact face 116 of the second separation cam 104 is periodically positioned across the centerline $C_L$ of the conveyance pathway 122 such that the contact face 116 of the second separation cam 104 can contact a second surface 904 of the continuous scored glass ribbon 900 and displace a portion of the continuous scored glass ribbon 900 in a second displacement direction 144 which is opposite the first displacement direction 142 (FIG. 11). In the embodiment shown in FIG. 10, the first separation cam 102 and the second separation cam 104 are rotated in opposite directions as indicated by arrows 146, 148. However, it should be understood that the first separation cam 102 and the second separation cam 104 may be rotated in the same direction, such as when the first separation cam and the second separation cam comprises roller elements, as described above.

The continuous scored glass ribbon 900 is directed into the separation apparatus on the conveyance pathway 122 which is disposed between the first separation cam 102 and the second separation cam 104. The first drive mechanism 106 and the second drive mechanism 108 are synchronized such that at least a portion of the contact face 114 of the first separation cam 102 and at least the portion of the contact face 116 of the second separation cam 104 periodically extend across the centerline of the conveyance pathway 122 and contact opposing surfaces of the continuous scored glass ribbon 900 at a separation time and periodically do not extend across the centerline and do not simultaneously contact opposing surfaces of the continuous scored glass ribbon 900 at a non-separation time.

For example, in some embodiments, the rotation of the first separation cam 102 and the second separation cam 104 may be synchronized with one another and the draw speed of the glass sheet such that a vent 920 formed in the glass is located between the first separation cam 102 and the second separation cam 104 (i.e., the vent 920 is located downstream of the first separation cam 102 and upstream of the second separation cam 104) as the contact face 114 of the first separation cam 102 contacts a first surface 902 of the continuous scored glass ribbon 900 and the contact face 116 of the second separation cam 104 contacts a second surface 904 of the continuous scored glass ribbon 900. As shown in FIG. 11, the first separation cam 102 displaces a portion of the continuous scored glass ribbon 900 from the centerline $C_L$ of the convey-ance pathway 122 in a first displacement direction 142 and the second separation cam 104 simultaneously displaces a portion of the continuous scored glass ribbon 900 from the centerline $C_L$ of the conveyance pathway 122 in a second displacement direction 144 opposite the first displacement direction. The simultaneous displacement of the scored glass ribbon in the first displacement direction 142 and the second displacement direction 144 propagates the vent 920 through the thickness of the glass ribbon thereby separating a discrete glass substrate 950 from the continuous scored glass ribbon 900 along a score line of the continuous scored glass ribbon.

In another embodiment (not shown), simultaneous displacement of the continuous scored glass ribbon 900 in the first displacement direction 142 and the second displacement direction 144 may occur when the vent 920 is positioned on the contact face 114 of the first separation cam 102, on the contact face 116 of the second separation cam 104, slightly upstream of the first separation cam 102, or slightly downstream of the second separation cam 104.

Figure 12:
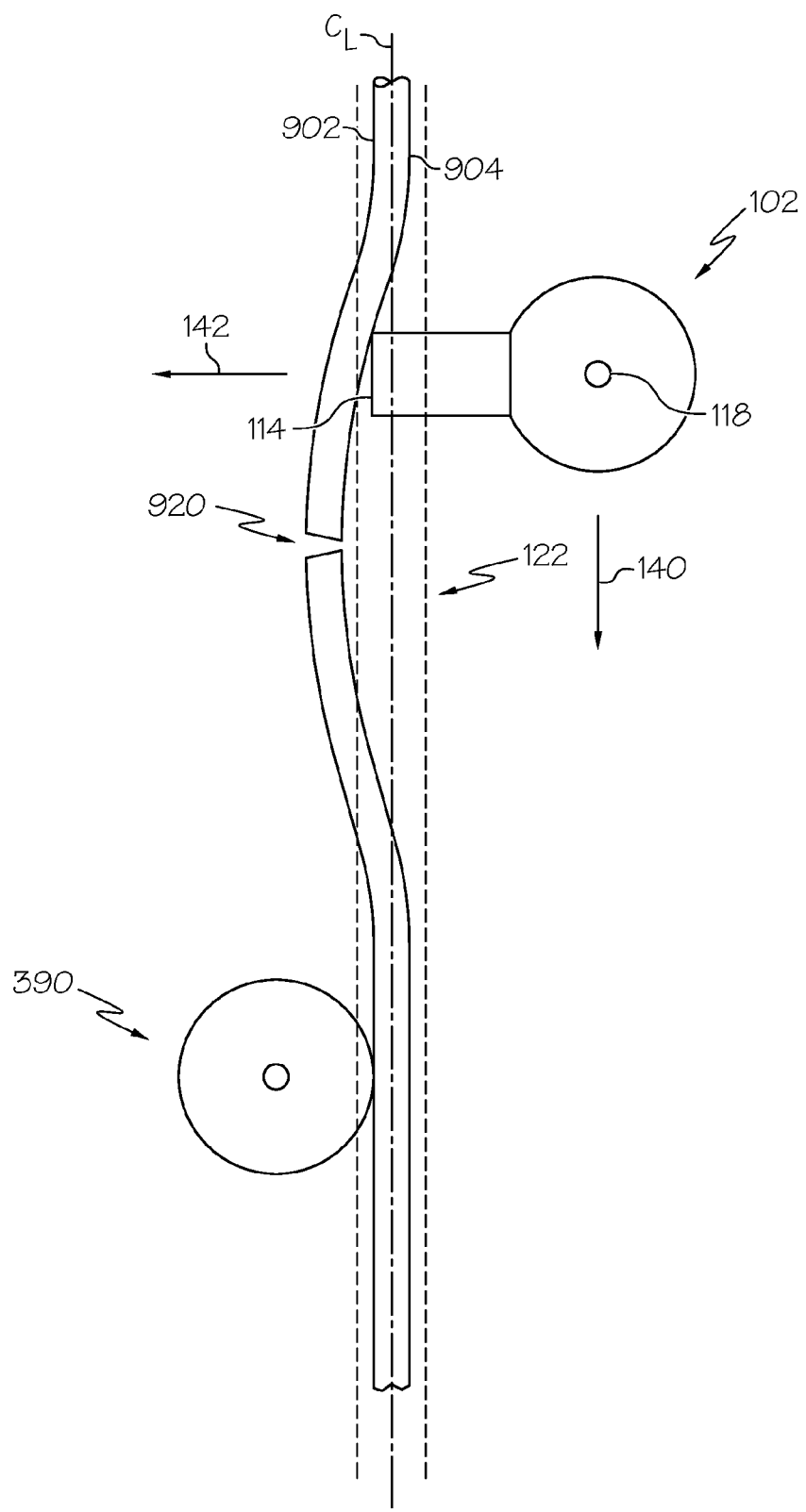
FIG. 12 schematically depicts a separation apparatus with a single separation cam being used to separate a glass substrate according to one or more embodiments shown and described herein.

Referring now to FIG. 12, Referring now to FIG. 12, a separation apparatus 101 which includes a single separation cam (i.e., the first separation cam 102) is schematically depicted separating a glass sheet from a continuous ribbon of brittle material. The continuous ribbon of brittle material, such as a continuous glass ribbon, is drawn on the conveyance pathway 122 in a draw direction 140 which, in this embodiment, is a substantially vertical direction. The center through the thickness Ts of the continuous glass ribbon is at least initially aligned with the centerline $C_L$ of the conveyance pathway 122. As the continuous glass ribbon is drawn, the ribbon may be scored across the width of the ribbon thereby creating a vent 920 in at least one surface of the ribbon. As the continuous scored glass ribbon 900 is conveyed along the conveyance pathway 122, the first separation cam 102 of the separation apparatus 100 is rotated such that at least a portion of a contact face 114 of the first separation cam 102 is periodically positioned across the centerline $C_L$ of the conveyance pathway 122 such that the contact face 114 of the first separation cam 102 can contact a first surface 902 of the continuous scored glass ribbon 900 and displace a portion of the continuous scored glass ribbon 900 in a first displacement direction 142.

The continuous scored glass ribbon 900 is directed into the separation apparatus on the conveyance pathway 122. The first drive mechanism 106 is synchronized with the drawing rate of the glass ribbon such that at least a portion of the contact face 114 of the first separation cam 102 periodically extends across the centerline of the conveyance pathway 122 and contacts the surface of the continuous scored glass ribbon 900 at a separation time and periodically does not extend across the centerline at a non-separation time. For example, in some embodiments, the rotation of the first separation cam 102 may be synchronized with the draw speed of the glass sheet such that a vent 920 formed in the glass is located downstream of the first separation cam 102 as the contact face 114 of the first separation cam 102 contacts a first surface 902 of the continuous scored glass ribbon 900. As shown in FIG. 12, the first separation cam 102 displaces a portion of the continuous scored glass ribbon 900 from the centerline $C_L$ of the conveyance pathway 122 in a first displacement direction 142. The displacement of the scored glass ribbon in the first displacement direction 142, in conjunction with the weight of the glass ribbon downstream of the first separation cam 102 and/or a circular idler roll 390 positioned downstream of the first separation cam 102, propagate the vent 920 through the thickness of the glass ribbon thereby separating a discrete glass substrate 950 from the continuous scored glass ribbon 900 along a score line of the continuous scored glass ribbon.

In another embodiment (not shown), displacement of the continuous scored glass ribbon 900 in the first displacement direction 142 may occur when the vent 920 is positioned on the contact face 114 of the first separation cam 102 or slightly upstream of the first separation cam 102.

Figure 13:
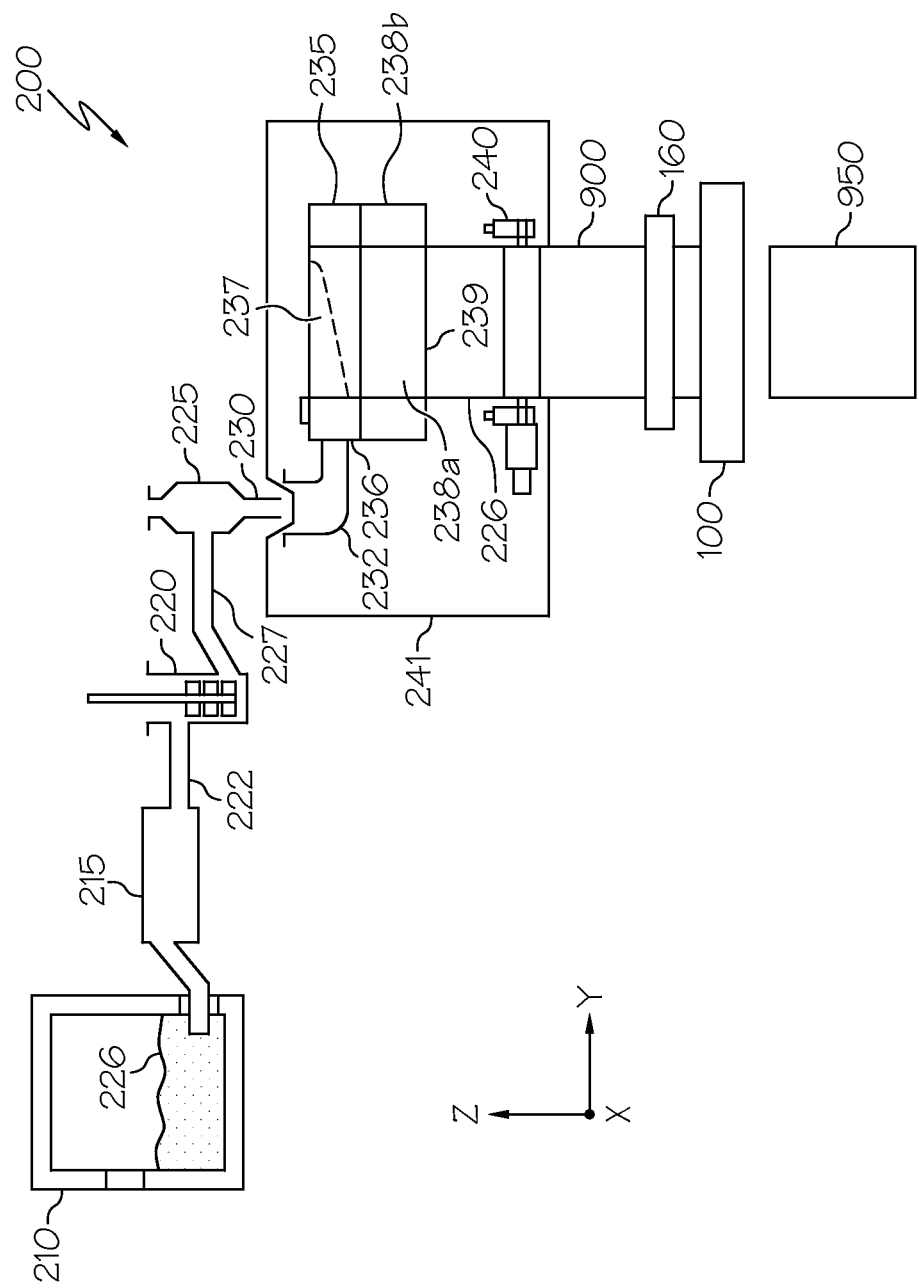
FIG. 13 schematically depicts a glass manufacturing apparatus which includes a separation apparatus for separating glass substrates from continuous glass ribbons, according to one or more embodiments shown and describe herein.

Referring now to FIG. 13, the separation apparatuses described herein may be used in conjunction with a glass manufacturing system in order to produce discrete glass substrates from continuous ribbons of glass. For example, one embodiment of an exemplary glass manufacturing system 200 is schematically depicted in FIG. 13. The glass manufacturing system utilizes a separation apparatus 100 as depicted in FIG. 1. The glass manufacturing system 200 includes a melting vessel 210, a fining vessel 215, a mixing vessel 220, a delivery vessel 225, a fusion draw machine (FDM) 241, a scoring apparatus 160 and a separation apparatus 100. Glass batch materials are introduced into the melting vessel 210 as indicated by arrow 212. The batch materials are melted to form molten glass 226. The fining vessel 215 has a high temperature processing area that receives the molten glass 226 from the melting vessel 210 and in which bubbles are removed from the molten glass 226. The fining vessel 215 is fluidly coupled to the mixing vessel 220 by a connecting tube 222. The mixing vessel 220 is, in turn, fluidly coupled to the delivery vessel 225 by a connecting tube 227.

The delivery vessel 225 supplies the molten glass 226 through a downcomer 230 into the FDM 241. The FDM 241 comprises an inlet 232, a forming vessel 235, and a pull roll assembly 240. As shown in FIG. 2, the molten glass 226 from the downcomer 230 flows into an inlet 232 which leads to the forming vessel 235. The forming vessel 235 includes an opening 236 that receives the molten glass 226 which flows into a trough 237 and then overflows and runs down two sides 238*a* and 238*b* before fusing together at a root 239. The root 239 is where the two sides 238*a* and 238*b* come together and where the two overflow walls of molten glass 226 rejoin (e.g., refuse) before being drawn downward by the pull roll assembly 240 to form the continuous glass ribbon. The continuous glass ribbon is initially passed through a scoring apparatus 160 where a partial vent is formed in at least one surface of the continuous glass ribbon, thereby forming a continuous scored glass ribbon 900. The scoring apparatus 160 is synchronized with the draw speed of the glass ribbon such that the continuous glass ribbon is scored at regular intervals. Thereafter, the continuous scored glass ribbon 900 is directed through the separation apparatus 100 where the continuous scored glass ribbon 900 is separated in to a discrete glass substrates 950, as described above.

It should now be understood that the apparatuses and methods described herein may be used for separating continuous glass ribbons into discrete glass substrates. The apparatuses described herein may be utilized to increase the draw speed of glass manufacturing systems and thereby improve manufacturing throughput. Specifically, the use of rotating cams in a fixed frame or enclosure enables a continuous glass ribbon to be separated with a fixed or stationary device rather than a device which travels with the glass ribbon as the ribbon is conveyed. This eliminates the necessity of cycling the separation device upstream following separation of a glass substrate from the glass ribbon and also eliminates the step of matching the speed of the separation apparatus with the conveyance speed of the glass ribbon. Elimination of both of these steps allows the draw speed of the glass manufacturing apparatus to be increased as the glass separation device is no longer a rate limiting step.

Based on the foregoing, it should be understood that a plurality of aspects of the methods and apparatuses described herein are discloses. In a first aspect, a separation apparatus for separating a sheet of brittle material along a scoring line includes a first separation cam positioned adjacent to a conveyance pathway, wherein the first separation cam is rotatably coupled to a first drive mechanism rotating the first separation cam about a first axis of rotation. The first drive mechanism rotates the first separation cam such that at least a portion of a contact face of the first separation cam periodically extends across a centerline of the conveyance pathway. The first drive mechanism is synchronized with a draw rate of the sheet of brittle material such that at least the portion of the contact face of the first separation cam extends across the centerline of the conveyance pathway at a separation time and periodically does not extend across the centerline of the conveyance pathway at a non-separation time.

In a second aspect, a separation apparatus for separating a sheet of brittle material along a scoring line includes a first separation cam positioned adjacent to a sheet conveyance pathway. The first separation cam is rotatably coupled to a first drive mechanism rotating the first separation cam about a first axis of rotation such that rotation of the first separation cam defines a first separation sweep area and a first non-separation sweep area centered on the first axis of rotation. The first separation sweep area is greater than the first non-separation sweep area. A second separation cam positioned opposite and downstream of the first separation cam on the sheet conveyance pathway. The second separation cam is rotatably coupled to a second drive mechanism rotating the second separation cam about a second axis of rotation. Rotation of the second separation cam defines a second separation sweep area and a second non-separation sweep area centered on the second axis of rotation. The second separation sweep area is greater than the second non-separation sweep area. A first separation sweep radius $r_{s1}$ of the first separation sweep area is greater than a first distance $d_1$ between the first axis of rotation and a centerline of the conveyance pathway. The second separation sweep radius $r_{s2}$ of the second separation sweep area is greater than a second distance $d_2$ between a center point of the second axis of rotation and a centerline of the conveyance pathway. The first rotational drive mechanism and the second rotational drive mechanism synchronously rotate the first separation cam and the second separation cam such that at least a portion of a contact face of the first separation cam and at least a portion of the contact face of the second separation cam periodically extend across the centerline of the conveyance pathway at the same time.

A third aspect includes the separation apparatus of the first aspect, wherein a second separation cam positioned opposite from and downstream of the second separation cam on the conveyance pathway. The second separation cam is rotatably coupled to a second drive mechanism rotating the second separation cam about a second axis of rotation. The second drive mechanism rotates the second separation cam such that at least a portion of a contact face of the second separation cam periodically extends across the centerline of the conveyance pathway. The first drive mechanism and the second drive mechanism are synchronized such that at least the portion of the contact face of the first separation cam and at least the portion of the contact face of the second separation cam periodically extend across the centerline of the conveyance pathway at a separation time and periodically do not extend across the centerline of the conveyance pathway at a non-separation time.

A fourth aspect includes the separation apparatus of the third aspect, wherein the first drive mechanism and the second drive mechanism are coupled to a common drive source.

A fifth aspect includes the separation apparatus of any of the first through fourth aspects, wherein the contact face of the first separation cam comprises a nosing material.

A sixth aspect includes the separation apparatus of the fifth aspect, wherein the nosing material of at least one of the first separation cam and the second separation cam extends across an entire width of the contact face.

A seventh aspect includes the separation apparatus of the fifth aspect, wherein the nosing material of at least one of the first separation cam and the second separation cam extends across less than an entire width of the contact face.

An eighth aspect includes the separation apparatus of any of the second through seventh aspects wherein the first separation cam and the second separation cam are rotated in opposite directions.

A ninth aspect includes the separation apparatus of any of the first through eighth aspects wherein the contact face of the first separation cam comprises a roller element.

A tenth aspect includes the separation apparatus of any of the first through ninth aspects wherein the first separation cam is elliptical in cross section.

An eleventh aspect includes the separation apparatus of any of the first through ninth aspects wherein the first separation cam is circular in cross section and the first axis of rotation is non-concentric with a center of the first separation cam.

A twelfth aspect includes the separation apparatus of any of the second through eleventh aspects wherein the conveyance pathway is vertically oriented and the first separation cam and the second separation cam are spaced apart in a horizontal direction and offset from one another in a vertical direction.

A thirteenth aspect includes the separation apparatus of any of the second through twelfth aspects wherein rotation of the first separation cam defines a first separation sweep area and a first non-separation sweep area centered on the first axis of rotation, wherein the first separation sweep area is greater than the first non-separation sweep area and rotation of the second separation cam defines a second separation sweep area and a second non-separation sweep area centered on the second axis of rotation, wherein the first separation sweep area is greater than the first non-separation sweep area.

A fourteenth aspect includes the separation apparatus of any of the third through thirteenth aspects wherein a first separation sweep radius $r_{s1}$ of the first separation sweep area is greater than a first distance $d_1$ between the first axis of rotation and a centerline of the conveyance pathway and a second separation sweep radius $r_{s2}$ of the second separation sweep area is greater than a second distance $d_2$ between a center point of the second axis of rotation and a centerline of the conveyance pathway.

A fifteenth aspect includes the separation apparatus of the fourteenth aspect wherein the first non-separation sweep area has a first non-separation sweep radius $r_{n1}$, the first non-separation sweep area has a second non-separation sweep radius $r_{n2}$, and $r_{n1}+r_{n2} \leq (d_1+d_2-T_s)$, wherein Ts is a thickness of a sheet of brittle material drawn between the first separation cam and the second separation cam.

In a sixteenth aspect, the separation apparatus of any of the second through fifteenth aspects further includes a third separation cam positioned on a same side of the conveyance pathway as the first separation cam and having an axis of rotation which is coaxial with the first separation cam and a fourth separation cam positioned on a same side of the conveyance pathway as the second separation cam and having an axis of rotation which is coaxial with the second separation cam.

A seventeenth aspect, includes the separation apparatus of the sixteenth aspect wherein the third separation cam is rotatably coupled to the first drive mechanism; the fourth separation cam is rotatably coupled to the second drive mechanism; and the first drive mechanism and the second drive mechanism are synchronized such that at least the portion of the contact face of the third separation cam and at least the portion of the contact face of the fourth separation cam periodically extend across the centerline of the conveyance pathway at a separation time and periodically do not extend across the centerline of the conveyance pathway at a non-separation time.

An eighteenth aspect includes a method of separation a glass substrate utilizing a separation apparatus of any of the first through seventeenth aspects.

In a nineteenth aspect, a method for separating a glass substrate may include conveying a scored glass ribbon on a conveyance pathway in a conveyance direction. The scored glass ribbon may be directed between a first separation cam and a second separation cam. The second separation cam may be positioned downstream of the first separation cam in the conveyance direction. The first separation cam and the second separation cam may be positioned on opposite sides of a centerline of the conveyance pathway. The first separation cam may be rotated such that at least a portion of a contact face of the first separation cam is periodically positioned across the centerline of the conveyance pathway and the contact face of the first separation cam periodically contacts a first surface of the scored glass ribbon and displaces at least a portion of the scored glass ribbon from the centerline of the conveyance pathway in a first displacement direction. The second separation cam may be rotated simultaneously with the first separation cam such that at least a portion of a contact face of the second separation cam is periodically positioned across a centerline of the conveyance pathway and the contact face of the second separation cam periodically contacts a second surface of the scored glass ribbon and displaces at least a portion of the scored glass ribbon from the centerline of the conveyance pathway in a second displacement direction opposite the first displacement direction. The simultaneous displacement of the scored glass ribbon in the first displacement direction and the second displacement direction separates the scored glass ribbon along a vent in the scored glass ribbon.

In a twentieth aspect, a method for forming a glass substrate includes drawing a continuous glass ribbon in a substantially vertical direction from a forming apparatus. The continuous glass ribbon may be scored to form a vent as the continuous glass ribbon is drawn in the substantially vertical direction. Thereafter, a first portion of the continuous scored glass ribbon may be periodically displaced in a first direction which is non-parallel with the substantially vertical direction as the continuous scored glass ribbon is drawn in the substantially vertical direction. Additionally, a second portion of the continuous scored glass ribbon may be periodically displaced in a second direction opposite the first direction as the continuous glass ribbon is drawn in the substantially vertical direction. The second portion of the continuous scored glass ribbon may be downstream of the first portion of the continuous scored glass ribbon. The second portion of the continuous scored glass ribbon is displaced simultaneously with the first portion of the continuous scored glass ribbon such that a glass substrate is separated from the continuous glass ribbon along the vent.

A twenty-first aspect includes the method of the nineteenth aspect, wherein the conveyance direction is a substantially vertical direction.

A twenty-second aspect includes the method of the twentieth aspect, wherein the first portion of the continuous scored glass ribbon is periodically displaced by a first separation cam and the second portion of the continuous scored glass ribbon is periodically displaced by a second separation cam positioned downstream of the first separation cam.

A twenty-third aspect includes the method of any of the nineteenth or twenty-second aspects, wherein the scored glass ribbon is displaced in the first displacement direction and the second displacement direction when the vent of the scored glass ribbon is downstream of the first separation cam and upstream of the second separation cam.

A twenty-fourth aspect includes the method of any of the nineteenth and twenty-second through twenty-third aspects, wherein the first separation cam is rotated about a first axis of rotation such that the first separation cam defines a first separation sweep area and a first non-separation sweep area centered on the first axis of rotation, wherein the first separation sweep area is greater than the first non-separation sweep area; and the second separation cam is rotated about a second axis of rotation such that the second separation cam defines a second separation sweep area and a second non-separation sweep area centered on the second axis of rotation, wherein the second separation sweep area is greater than the second non-separation sweep area.

A twenty-fifth aspect includes the method of the twenty-fourth aspect, wherein a separation radius $r_s$ of the first separation sweep area is greater than a distance $d_{CL}$ between a center of the first axis of rotation and a centerline of the conveyance pathway; and a separation radius $r_s$ of the second separation sweep area is greater than a distance $d_{CL}$ between a center point of the second axis of rotation and a centerline of the conveyance pathway.

A twenty-sixth aspect includes the method of the twentieth aspect, wherein the vent is positioned between the first portion of the continuous scored glass ribbon and the second portion of the continuous scored glass ribbon.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for separating a glass substrate, the method comprising:
    conveying a continuous scored glass ribbon on a conveyance pathway in a conveyance direction;
    directing the continuous scored glass ribbon between a first separation cam and a second separation cam positioned downstream of the first separation cam in the conveyance direction, wherein the first separation cam and the second separation cam are on opposite sides of a centerline of the conveyance pathway and the first separation cam and the second separation cam are non-circular-symmetric about their respective axes of rotation;
    rotating the first separation cam such that at least a portion of a contact face of the first separation cam is periodically positioned across the centerline of the conveyance pathway and the contact face of the first separation cam periodically contacts a first surface of the continuous scored glass ribbon and displaces at least a portion of the continuous scored glass ribbon from the centerline of the conveyance pathway in a first displacement direction;
    rotating the second separation cam simultaneously with the first separation cam such that at least a portion of a contact face of the second separation cam is periodically positioned across a centerline of the conveyance pathway and the contact face of the second separation cam periodically contacts a second surface of the continuous scored glass ribbon and displaces at least a portion of the continuous scored glass ribbon from the centerline of the conveyance pathway in a second displacement direction opposite the first displacement direction; and
    wherein a simultaneous displacement of the continuous scored glass ribbon in the first displacement direction and the second displacement direction separates the continuous scored glass ribbon along a vent of the continuous scored glass ribbon.

2. The method of claim 1, wherein the conveyance direction is a substantially vertical direction.

3. The method of claim 1, wherein the continuous scored glass ribbon is displaced in the first displacement direction and the second displacement direction when the vent of the continuous scored glass ribbon is downstream of the first separation cam and upstream of the second separation cam.

4. The method of claim 1, wherein:
    the first separation cam is rotated about a first axis of rotation such that the first separation cam defines a first separation sweep area and a first non-separation sweep area centered on the first axis of rotation, wherein the first separation sweep area is greater than the first non-separation sweep area; and
    the second separation cam is rotated about a second axis of rotation such that the second separation cam defines a second separation sweep area and a second non-separation sweep area centered on the second axis of rotation, wherein the second separation sweep area is greater than the second non-separation sweep area.

5. The method of claim 4, wherein:
    a separation radius $r_s$ of the first separation sweep area is greater than a distance $d_{CL}$ between a center of the first axis of rotation and a centerline of the conveyance pathway; and
    a separation radius $r_s$ of the second separation sweep area is greater than a distance $d_{CL}$ between a center point of the second axis of rotation and a centerline of the conveyance pathway.

6. A method for forming a glass substrate comprising:
    drawing a continuous glass ribbon in a substantially vertical direction from a forming apparatus;
    scoring the continuous glass ribbon to form a vent as the continuous glass ribbon is drawn in the substantially vertical direction to form a continuous scored glass ribbon;
    displacing, periodically, a first portion of the continuous scored glass ribbon in a first direction which is non-parallel with the substantially vertical direction with a first rotating separation cam as the continuous scored glass ribbon is drawn in the substantially vertical direction;
    displacing, periodically, a second portion of the continuous scored glass ribbon in a second direction opposite the first direction with a second rotating separation cam as the continuous scored glass ribbon is drawn in the substantially vertical direction, wherein:
        the first rotating separation cam and the second rotating separation cam are non-circular-symmetric about their respective axes of rotation;

the second portion of the continuous scored glass ribbon is downstream of the first portion of the continuous scored glass ribbon; and the second portion of the continuous scored glass ribbon is displaced simultaneously with the first portion of the continuous scored glass ribbon such that a glass substrate is separated from the continuous scored glass ribbon along the vent.

7. The method of claim 6, wherein the vent is positioned between the first portion of the continuous scored glass ribbon and the second portion of the continuous scored glass ribbon.

8. The method of claim 6, wherein the first portion of the continuous scored glass ribbon is periodically displaced by a first separation cam and the second portion of the continuous scored glass ribbon is periodically displaced by a second separation cam positioned downstream of the first separation cam.

\* \* \* \* \*